United States Patent
Ng

(10) Patent No.: US 7,706,510 B2
(45) Date of Patent: Apr. 27, 2010

(54) SYSTEM AND METHOD FOR PERSONALIZED TEXT-TO-VOICE SYNTHESIS

(75) Inventor: Eric Ng, Daly City, CA (US)

(73) Assignee: Research In Motion, Waterloo (CA)

( * ) Notice: Subject to any disclaimer, the term of this patent is extended or adjusted under 35 U.S.C. 154(b) by 889 days.

(21) Appl. No.: 11/081,939

(22) Filed: Mar. 16, 2005

(65) Prior Publication Data
US 2006/0210028 A1      Sep. 21, 2006

(51) Int. Cl.
*H04M 11/00* (2006.01)
(52) U.S. Cl. .................................. 379/88.14; 704/260
(58) Field of Classification Search ... 379/88.13–88.14, 379/88.01, 88.02; 704/260
See application file for complete search history.

(56) References Cited

U.S. PATENT DOCUMENTS

| | | | |
|---|---|---|---|
| 5,774,841 A * | 6/1998 | Salazar et al. | 704/225 |
| 6,289,085 B1 * | 9/2001 | Miyashita et al. | 379/88.02 |
| 6,502,073 B1 * | 12/2002 | Guan et al. | 704/255 |
| 6,801,931 B1 | 10/2004 | Ramesh et al. | |
| 7,203,648 B1 * | 4/2007 | Ostermann et al. | 704/260 |
| 2003/0028380 A1 * | 2/2003 | Freeland et al. | 704/260 |
| 2003/0120489 A1 | 6/2003 | Krasnansky et al. | |

FOREIGN PATENT DOCUMENTS

| | | |
|---|---|---|
| CA | 2 521 440 A1 | 11/2004 |
| EP | 0 901 000 A | 3/1999 |
| EP | 1 168 297 A | 1/2002 |

OTHER PUBLICATIONS

Office Action issued on Corresponding Canadian Patent Application No. 2,539,649 mailed May 21, 2009.

* cited by examiner

*Primary Examiner*—Simon Sing
(74) *Attorney, Agent, or Firm*—Geoffrey deKleine; Borden Ladner Gervais LLP

(57) ABSTRACT

A communication device and method are provided for audibly outputting a received text message to a user, the text message being received from a sender. A text message to present audibly is received. An output voice to present the text message is retrieved, wherein the output voice is synthesized using predefined voice characteristic information to represent the sender's voice. The output voice is used to audibly present the text message to the user.

14 Claims, 2 Drawing Sheets

SYSTEM AND METHOD FOR PERSONALIZED TEXT-TO-VOICE SYNTHESIS

The present invention relates generally to text-to-voice synthesis and specifically to a method and system for personalizing such synthesis.

BACKGROUND OF THE INVENTION

Text-to-voice synthesis technology provides the ability to convert arbitrary text into audible speech. Accordingly, this technology may be used to provide textual information to people via voice messages. These voice messages can prove especially useful in applications where audible output is a preferable form of user feedback when interacting with a communication device. For example, this feature is extremely useful when receiving text messages on the communication device while the user is driving.

With the proliferation of wireless communication devices, including personal digital assistants, smart cellular telephones, portable computers, two-way pagers and the like, the need is growing for providing the user of a wireless communication device with a means for providing textual information to people via voice messages.

However, current systems generally use a single pre-selected voice to present the voice messages for presenting all incoming text messages in an audible format. This limitation may present several issues, which are described as follows.

Presenting all incoming text messages using a single voice will likely result in a monotonous tone for the voice message. Accordingly, it may be difficult for the user of the device user (referred to as "the user") to properly interpret the message the first time it is heard. Further, it may be difficult for the device user to focus on the message, which may cause the device user to subconsciously ignore portions of the message. Therefore, the purpose or idea behind the message may not be properly interpreted.

Additionally, the device user may confuse content from different messages. Since a single voice presents different voice messages, there is no easy way for the device user to distinguish between different messages.

Also, the sender's personality is not represented vocally. For example, an email from a quick and anxious person is typically presented in the monotonous and is not distinguishable from a message received from a person who is soft and calm.

All of the above issues affect the way the user responds to the incoming message. Accordingly, it is an object of the present invention to obviate or mitigate at least some of the above-mentioned disadvantages.

SUMMARY OF THE INVENTION

In accordance with an aspect of the present invention there is provided a communication device for audibly outputting a received text message to a user, the device comprising: data representing voice characteristic information associated with a sender of the text message; a processor for synthesizing an output voice in accordance with the voice characteristic information; and output for audibly presenting the text message to the user using the output voice.

In accordance with a further aspect of the present invention there is provided a method for audibly outputting a received text message to a user via a communication device, the text message being received from a sender, the method comprising the steps of: receiving a text message to present audibly; retrieving an output voice to present the text message, the output voice being synthesized using predefined voice characteristic information to represent the sender's voice; and using the output voice to audibly present the text message to the user.

BRIEF DESCRIPTION OF THE DRAWINGS

The invention will now be described by way of example only with reference to the following drawings in which.

DETAILED DESCRIPTION OF THE PREFERRED EMBODIMENT

Figure 1:
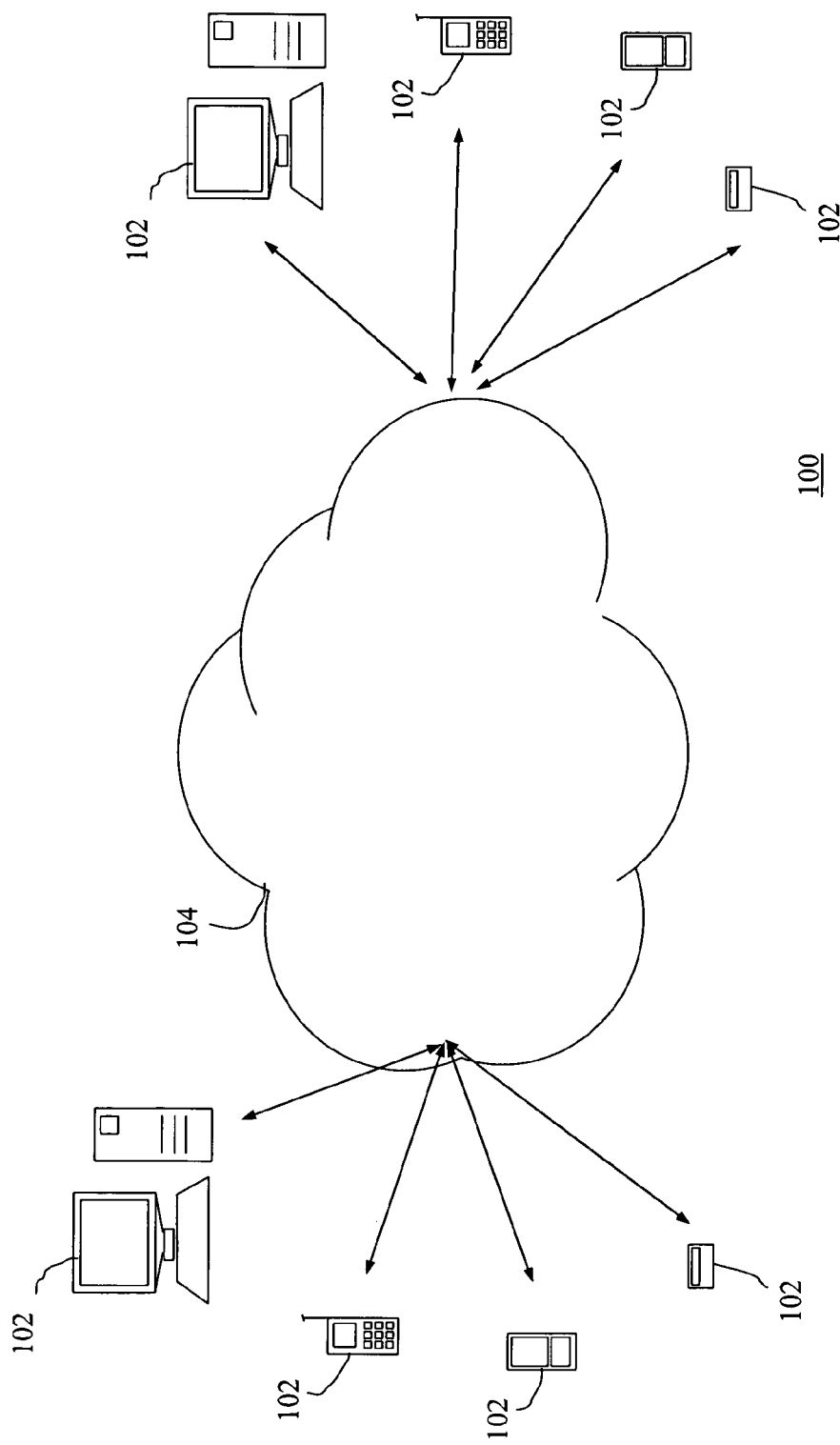
FIG. 1 is a block diagram illustrating a communication network.

For convenience, like numerals in the description refer to like structures in the drawings.

Referring to FIG. 1, a communication network infrastructure is illustrated generally by numeral 100. The communication network infrastructure 100 comprises a plurality of communication devices 102 and a communication network 104.

The communication devices 102, also referred to simply as devices 102, may include any wired or wireless device such as a desktop computer, a laptop or mobile computer, a smart phone, a personal digital assistant, such as a Blackberry™ by Research in Motion for example, and the like. The communication devices 102 are in communication with each other via the communication network 104. Accordingly, the communication network 104 may include one or more of components including a wireless network, a relay, a Public Switched Telephone Network (PSTN), a Voice over Internet Protocol (VoIP) network, and the like.

In the present embodiment, specific voice characteristics of the sender are represented when the message is presented to the user in an audible format. Accordingly, the user will hear different voices for different messages, thereby making the message more interesting, allowing the user to more readily comprehend the message, and reducing the likelihood of confusing content between different messages.

Figure 2:
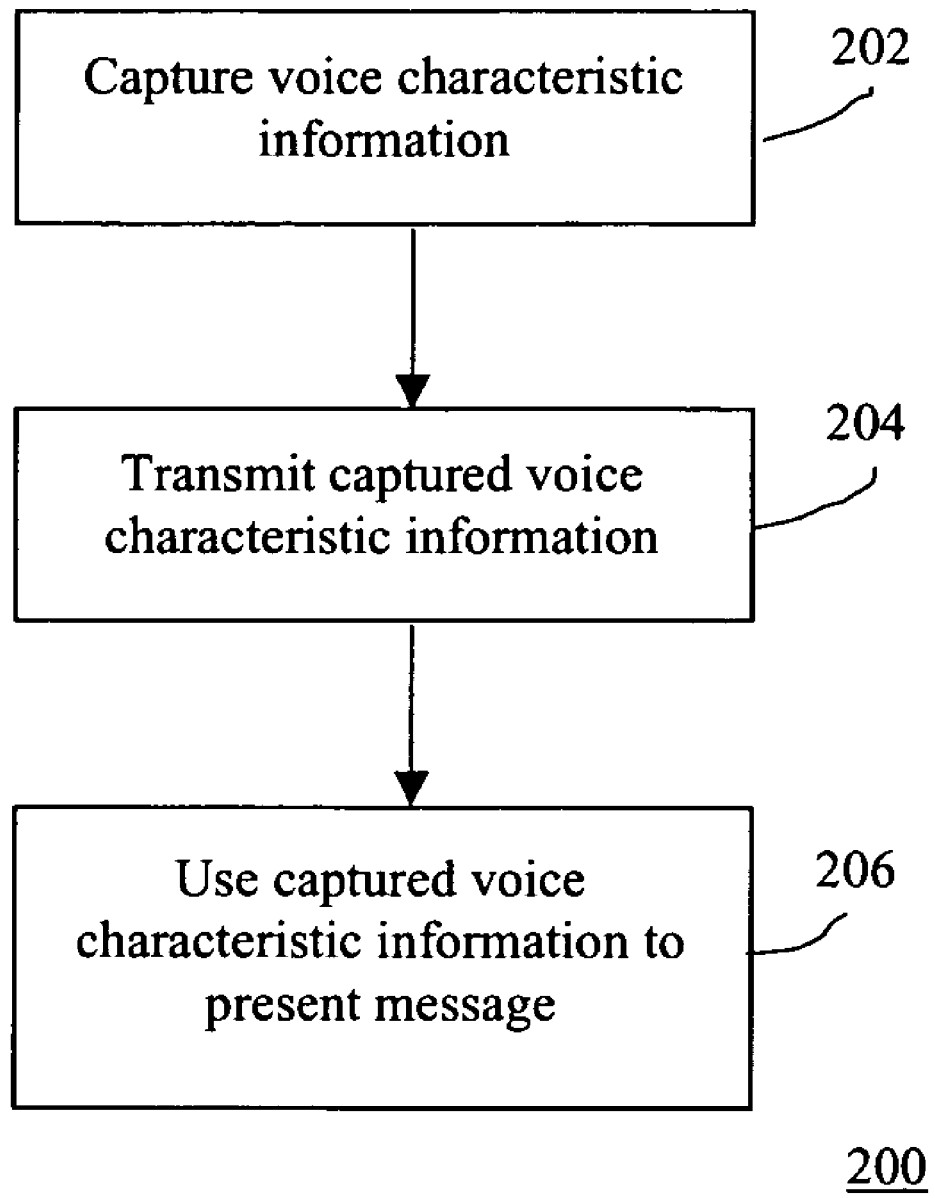
FIG. 2 is a flow chart illustrating the operation of personalizing text to voice synthesis.

Referring to FIG. 2, a flow chart illustrating the general operation of the present embodiment is represented by numeral 200. In step 202, voice characteristic information of the sender is captured. In step 204, the voice characteristic information is transmitted to the user along with the message. In step 206, the voice characteristic information is applied to the message as it is presented to the user.

The voice characteristic information discussed above may be as simple as a single bit indicating whether the sender is male or female. Alternately, the voice characteristic information may be more complex and capture more of the sender's voice characteristic information.

The sound of person's voice can be thought to be comprised of a plurality of voice characteristics. These voice characteristics can be captured in a number of different ways. The following paragraphs provide several examples of elements of a person's speech that characterize the sound of his or her voice.

The speed at which the sender speaks is one voice characteristic. The speaking speed can be determined by a number of factors, as will be appreciated by a person skilled in the art. For example, these factors may include the time it takes the sender to say a vowel, the time the sender rests between words, and the time the sender rests between sentences. These and other factors may be used either independently or combined together to determine a speed characteristic.

The frequency at which the sender speaks is another voice characteristic. Accordingly, a pitch of the sender's voice is determined. The level at which this voice characteristic is measured depends upon the implementation. That is, if it is sufficient to determine whether or not the voice is a male or female voice, then the frequency can be represented by a single bit and the user will be presented with either a generic male pitch or a generic female pitch for the voice.

Alternately, the pitch of the sender's voice may be encoded by a plurality of bits. Since more data is available to represent the pitch of the sender's voice, the system will be able to more closely mimic the actual pitch of the sender's voice when presenting the audio message to the user.

The volume at which the sender speaks is yet another voice characteristic. The overall volume at which the sender speaks can be defined by several variables including the general, or average, volume of the sender, the volume for a specific consonant or vowel, and the volume at, or just prior to, various types of punctuation.

As will be appreciated by a person of ordinary skill in the art, the above list is a small sample of possible ways of capturing voice characteristics.

In the present embodiment, the voice characteristic information is determined at the sender. The simplest method for selecting voice characteristic information allows the sender to select a voice from a list of at least two predefined voices. Preferably there is at least one male and one female voice from which to choose. The sender can then select the voice that they prefer most, but ideally they would select the voice that most accurately represents the sender's true voice.

If the set of predefined voices is common to all devices, then each of the predefined voices are assigned identifiers. The identifiers can be used by the user's device to identify the voice selected by the sender for presenting the message.

Alternately, if the set of predefined voices is not common to all devices, a series of differences, referred hereinafter to as voice deltas, are calculated with reference to a standard voice. The voice deltas can be used by the user's device to replicate the voice selected by the sender for presenting the message.

In an alternate embodiment, the sender is presented with a number of voice characteristic options. The sender can choose to set each of the voice characteristic options or leave them at a default value. Once the sender has set the desired voice characteristic options, a voice defined by the voice characteristic options is demonstrated to the sender using the sender's device.

If the sender is dissatisfied with the way the voice sounds, the sender can modify the voice characteristic options until the sender is satisfied. Once the sender is satisfied, the voice characteristic information can be used to represent the sender.

If the ability to interpret the voice characteristic options is common to all devices, then the values of the voice characteristic options can be sent to the user's device. The values can be used by the user's device to replicate the voice characteristic information defined by the sender for presenting the message.

Alternately, if the ability to interpret the voice characteristic options is not common to all devices, a series of voice deltas are calculated with reference to a standard voice for transmission to the user's device. The voice deltas can be used by the user's device to replicate the voice selected by the sender for presenting the message.

In yet an alternate embodiment, the sender's device is provided with a software application used to determine the sender's voice characteristics. The application prompts the user to speak a portion of text. The portion of text is preferably a predetermined phrase or paragraph, but it may also be a random phrase or paragraph selected by the sender. At present, a preferred phrase has not been established, however, a person skilled in the art will appreciate that the phrase should encapsulate the characteristics that are to be captured to facilitate accurate capture of the voice characteristics.

In the present embodiment, several voice characteristics are defined for the software to monitor. The voice characteristics used to define the sender's voice and which are monitored by the software include those described in detail above. Additional voice characteristics will become apparent to a person of ordinary skill in the art. Further, different embodiments may use various combinations of these voice characteristics as desired.

Similar to the previous embodiments, the voice characteristics can be transmitted to the user's device as either a set of voice characteristics or a series of voice deltas calculated between the spoken voice and a standard voice. The voice characteristics can be used by the user's device to replicate the voice monitored by the software for presenting the message.

In yet an alternate embodiment, the sender's device is provided with a software application used to monitor the sender's speech during conversation. This embodiment is particularly useful when the sender uses the device for other voice purposes, such as a cellular telephone or voice recorder. The software application monitors the sender's speech and dynamically adjusts the voice characteristics accordingly. When the sender transmits the message, the most recent version of the voice characteristics can be transmitted to the user's device as either a set of voice characteristics or a series of voice deltas calculated between the spoken voice and a standard voice. The voice characteristics can be used by the user's device to replicate the voice monitored by the software for presenting the message.

The voice characteristics of the sender will be transmitted along with the message. For email, the voice characteristic information can be embedded in a special header or digital signature. For instant messaging, the voice characteristic information can be embedded in the message header. Other transmission modes will be apparent to a person skilled in the art.

Yet further, the standard voice may be transmitted along with the voice characteristics when the voice characteristics are represents by voice deltas. This can be used to assure a consistent reference voice when the user's device attempts to mimic the sender's voice while presenting the message.

The user's device includes memory for storing the voice characteristic information associated with the sender of the text message and a processor for synthesizing an output voice in accordance with the voice characteristic information. The device further includes an output for audibly presenting the text message to the user using the output voice. Typically, the output is in the form of one or more speakers. However, the device may output the voice to an external device to audible output via a wired or wireless connection. For example, a smart phone with a Bluetooth™ connection used in a vehicle may output a signal to the vehicles audio system. The vehicle's audio system, in turn, outputs the voice using the vehicle's speaker system.

When the user chooses to listen to the message instead of reading it, the voice characteristic information transmitted along with the message is used to present the message. Depending upon the implementation the sender's voice is represented as a set of voice characteristic information or a series of voice deltas. The user's device uses the voice characteristic information to mimic the sender's voice and present the message to the user.

When presenting the message, the user's device may also utilize known text symbols to alter the voice characteristics during playback. For example, emoticons are a well-known form of representing emotions using icons. For example, a "smiley" is often represent as ":)". When a smiley is present in the text of the message, the tone of the voice can be altered to indicate they sender's emotion. As will be appreciated by a person skilled in the art, there are many possible emoticons that can used to represent a variety of emotions.

In all of the embodiments described above, the sender's voice characteristics are defined by the sender. In an alternate embodiment, the sender's voice characteristics may also be defined by the user. Therefore, if the sender does not, or cannot, define his or her voice characteristics, the user can still define certain voice characteristics to represent the sender.

In the present embodiment, the user can assign voice characteristic information to a sender identifier, such as an email address or instant message user identifier. Accordingly, when the user receives a message from a sender corresponding with the sender identifier, the voice characteristic information is used to present the message. Similar to the previous selection embodiments described, the user can select the voice characteristics in order to best represent the sender's voice.

Yet further, the user may have a software application on the user's device for analyzing a sender's voice. This can be applied, for example, if the user's device includes telephone functionality. In addition to the sender's email address, the sender identifier may also include information such as the sender's telephone numbers. When the user is on the phone, the sender may be identified by telephone, allowing the software to dynamically update the voice characteristics of the sender.

Although preferred embodiments of the invention have been described herein, it will be understood by those skilled in the art that variations may be made thereto without departing from the spirit of the invention or the scope of the appended claims.

What is claimed is:

1. A communication device for audibly outputting a received text message to a user in an output voice, the device comprising:
    a) means for receiving data representing voice characteristic information associated with a sender of the text message, wherein the data representing the voice characteristic information defines the voice characteristic information as a set of voice deltas, each of the voice deltas representing a difference between a desired voice characteristic of the output voice and a corresponding predefined voice characteristic of a standard voice,
    b) a processor for synthesizing an output voice in accordance with the voice characteristic information and said standard voice, wherein the output voice mimics a voice selected by the sender and the standard voice is a reference voice for use by a plurality of communication devices; and
    c) an output for audibly presenting the text message to the user using the output voice.

2. The communication device of claim 1, where the text message is an electronic mail message.

3. The communication device of claim 1, wherein the text message is an instant message.

4. The communication device of claim 1, wherein the voice selected by the send is the sender's voice.

5. The communication device of claim 1, further including means for retrieving the standard voice along with the voice deltas.

6. A method of audibly outputting a received text message to a user via a communication device, the method comprising:
    retrieving voice characteristic information associated with a sender of the received text message, the voice characteristic information defining a set of voice deltas, each of the voice deltas representing a difference between a desired voice characteristic of a voice selected by the sender and a corresponding predefined voice characteristic of a standard voice, the standard voice being a reference voice for use by a plurality of communication devices;
    synthesizing an output voice in accordance with the voice characteristic information and the predefined voice characteristic of the standard voice, the output voice mimicking the voice selected by the sender; and
    audibly outputting the received text message using the output voice.

7. A computer readable medium comprising computer-readable instructions, which when executed by a computer or a communication device, causes the computer or communication device to implement the method of claim 6.

8. The method of claim 6, wherein the voice selected by the sender is the sender's voice.

9. The method of claim 6, comprising retrieving the predefined voice characteristic of the standard voice.

10. A communication device for audibly outputting a received text message to a user, the device comprising:
    a processor to receive data representing voice characteristic information associated with a sender of the received text message, the voice characteristic information defining a set of voice deltas, each of the voice deltas representing a difference between a desired voice characteristic of a voice selected by the sender and a corresponding predefined voice characteristic of a standard voice, the standard voice being a reference voice for use by a plurality of communication devices and synthesize an output voice in accordance with the voice characteristic information and the corresponding predefined voice characteristic of the standard voice, the output voice mimicking the voice selected by the sender; and
    an output operatively coupled to the processor to audibly output the received text message to the user using the output voice.

11. The method of claim 10, wherein the text message is an electronic mail message.

12. The method of claim 10, wherein the text message is an instant message.

13. The communication device of claim 10, wherein the voice selected by the send is the sender's voice.

14. The communication device of claim 10, wherein the processor retrieves the predefined voice characteristic of the standard voice.

* * * * *

UNITED STATES PATENT AND TRADEMARK OFFICE
CERTIFICATE OF CORRECTION

| | | |
|---|---|---|
| PATENT NO. | : 7,706,510 B2 | Page 1 of 1 |
| APPLICATION NO. | : 11/081939 | |
| DATED | : April 27, 2010 | |
| INVENTOR(S) | : Eric Ng | |

It is certified that error appears in the above-identified patent and that said Letters Patent is hereby corrected as shown below:

Title page, item [73] the Assignee should read "Research In Motion Limited"

Signed and Sealed this

Twentieth Day of September, 2011

David J. Kappos
*Director of the United States Patent and Trademark Office*